Figure 1:
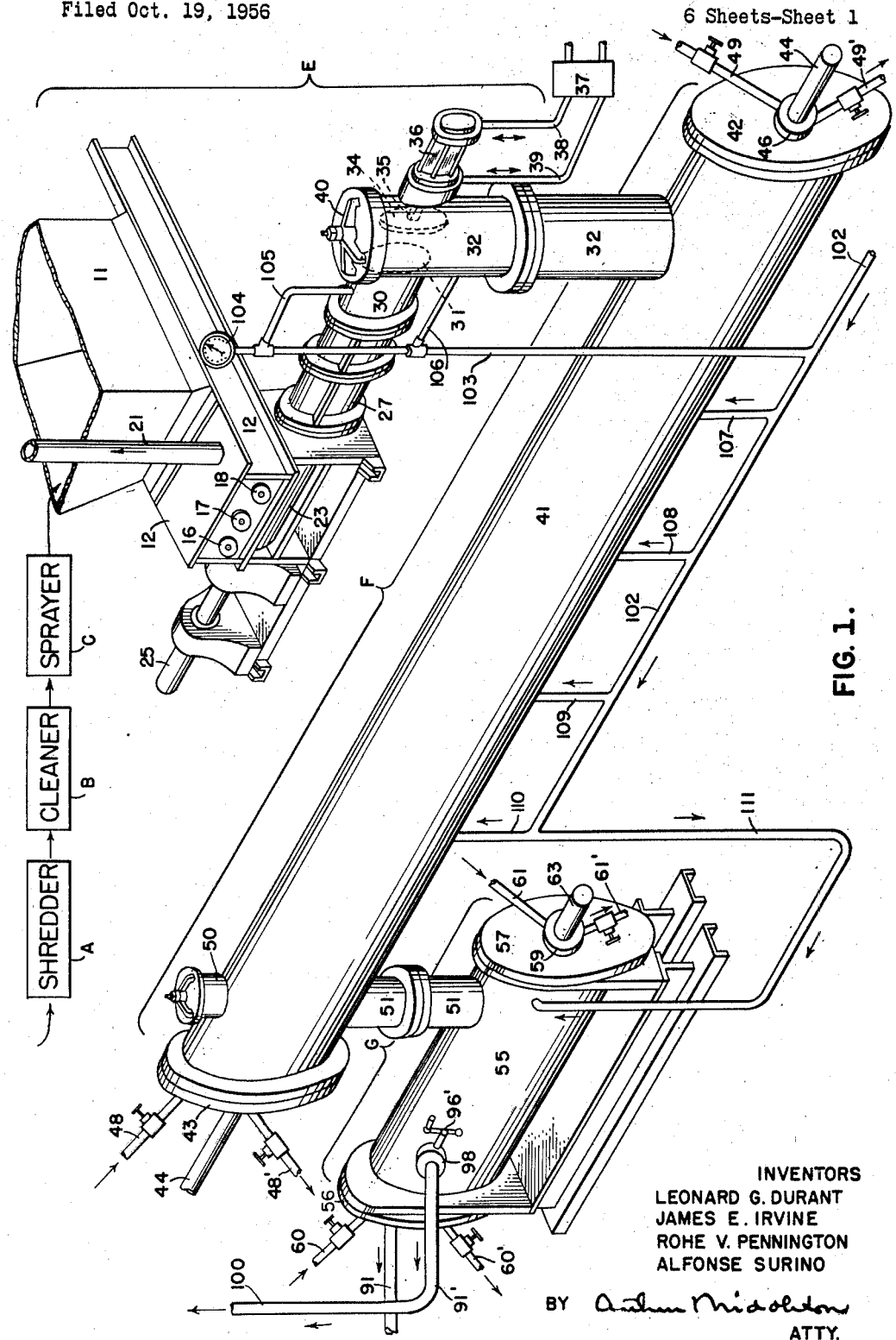

Oct. 27, 1959   L. G. DURANT ET AL   2,910,398
ASPHALT DISPERSION IN WASTE CELLULOSIC MATERIAL
Filed Oct. 19, 1956   6 Sheets-Sheet 3

INVENTORS
LEONARD G. DURANT
JAMES E. IRVINE
ROHE V. PENNINGTON
ALFONSE SURINO
BY Arthur Middleton
ATTY.

Oct. 27, 1959   L. G. DURANT ET AL   2,910,398
ASPHALT DISPERSION IN WASTE CELLULOSIC MATERIAL
Filed Oct. 19, 1956
FIG. 6.
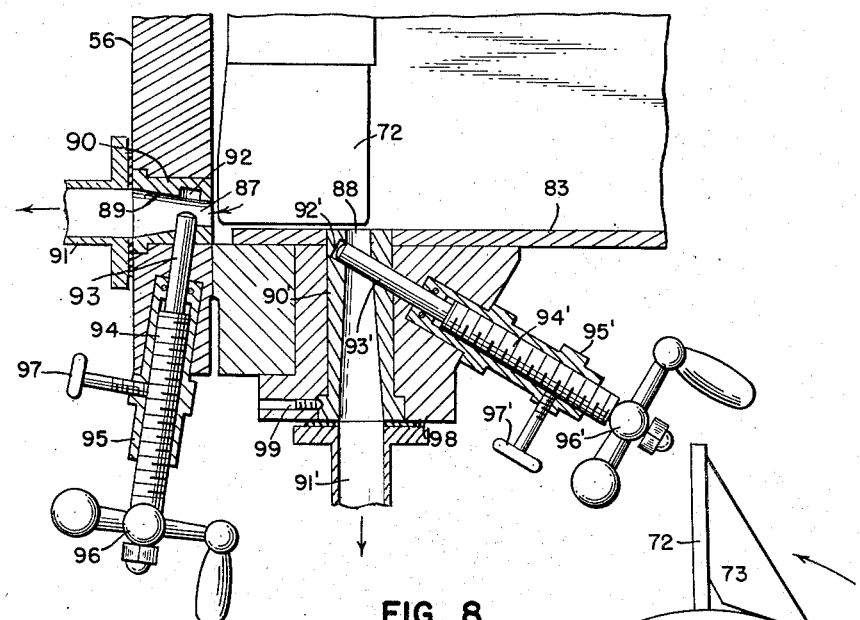
FIG. 7.
FIG. 8.
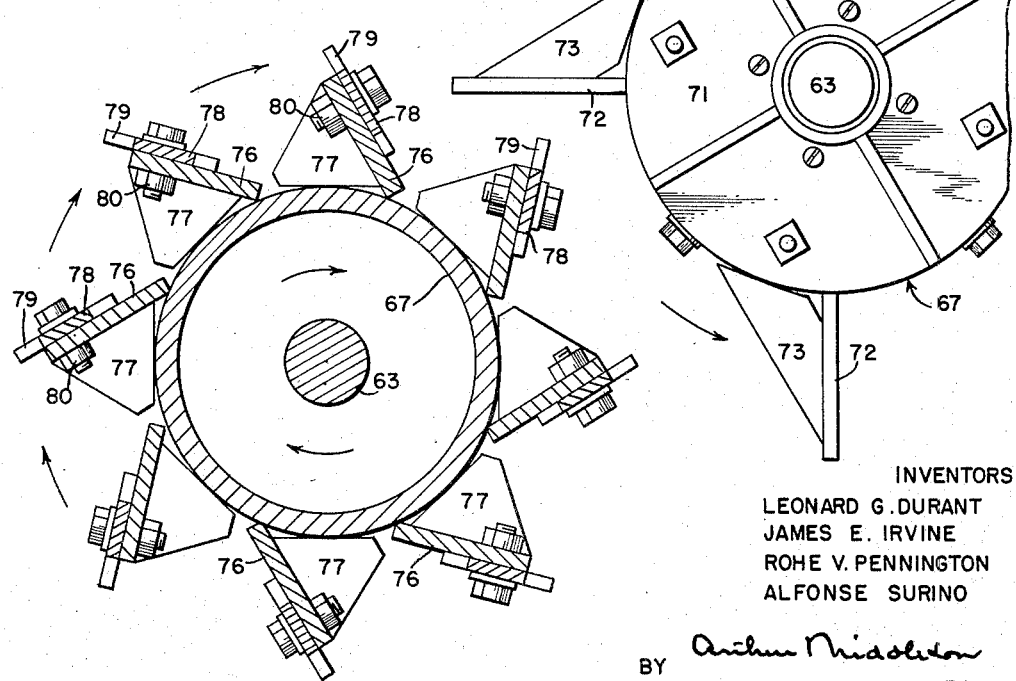
INVENTORS
LEONARD G. DURANT
JAMES E. IRVINE
ROHE V. PENNINGTON
ALFONSE SURINO
BY  Arthur Middleton
ATTY.

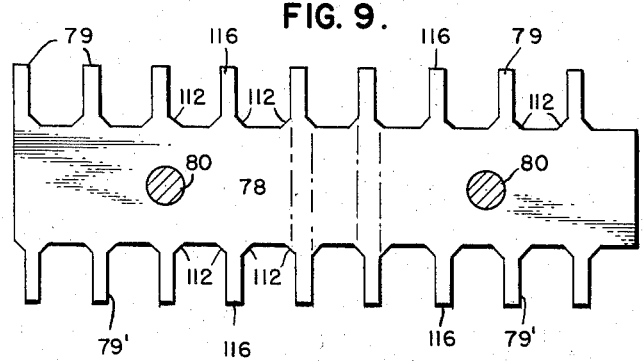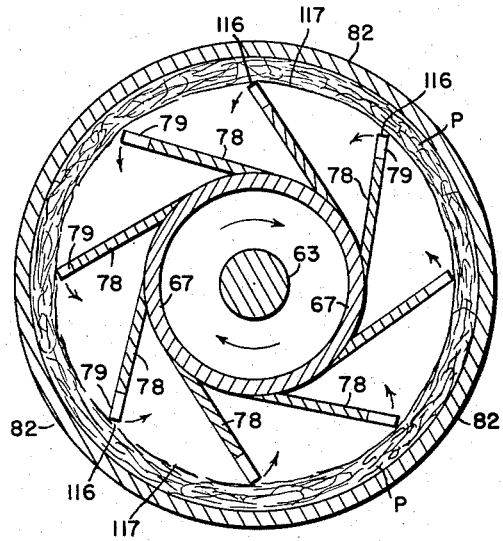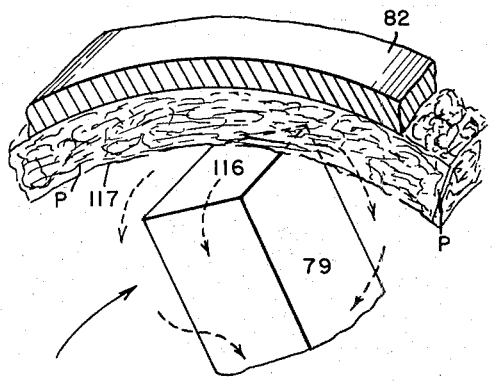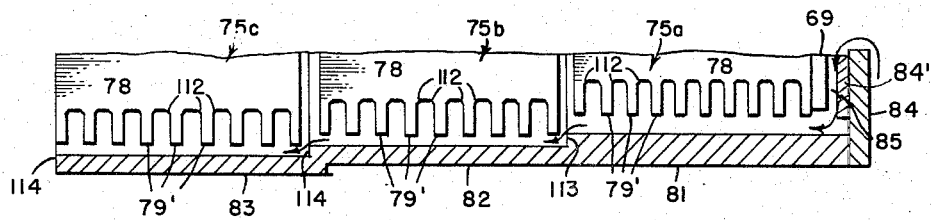

2,910,398

ASPHALT DISPERSION IN WASTE CELLULOSIC MATERIAL

Leonard G. Durant, James E. Irvine, Rohe V. Pennington, and Alphonse Surino, all of Pittsfield, Mass., assignors, by mesne assignments, to E. D. Jones Corporation, Pittsfield, Mass., a corporation of Delaware Application October 19, 1956, Serial No. 617,193

8 Claims. (Cl. 162—4)

This invention relates generally to the treatment of waste cellulosic material for the manufacture of paper and has particular reference to the treatment of pulp for the manufacture of corrugating paper, cardboard, boxboard, kraft papers, or the like, in the manufacture of which waste cellulosic material such as waste paper, used paper, and other paper scrap is made use of. These materials are more often than not contaminated with laminating additives for adhering sheets together whose particles are diminutable, such as asphalt, waxes, resins, or other such non-cellulosic heat-softenable materials that cause trouble in the manufacturing process and/or pass into the finished product wherein they appear as specks or globs rendering the end product unsightly. So it is an object of this invention to treat the waste paper in a manner whereby the contaminating heat-softenable constituent of the waste material is so reduced in the size of its particles and such particles are so completely dispersed throughout the pulp that the particles are not readily discernible as such.

The waste paper is in more or less sheeted form and it carries the asphalt-like contaminant as a coating of some of the cellulosic fibres and as globs and specks of varying sizes. Since the contaminant is to be thoroughly dispersed, the waste paper must be shredded and then the shreds heated to the flow-temperature of the contaminant and broken up into their component mass of more or less individualized fibres—all before the concentrations of the flowable asphalt can be gotten at to be dispersed. So it is an object of this invention to devise particular ways and means for accomplishing this whereby the component fibres of the waste paper are displaced, rearranged, and separated from each other and made into a mass or blanket thereof clinging to the interior of a cylinder by means of centrifugal force, while being heated in the cylinder to a temperature at or above the melting point of the asphalt or other contaminant. The next object is to redistribute the rearranged fibres and to diminute the asphalt concentrations as well as to disperse them throughout the redistributed fibres so it is another object of this invention to devise ways and means for so-doing this effectively while also particularly avoiding degradation of the fibres such as by shortening, cutting, or tearing them. Another object is to assure that the steam used to heat the mass reaches and permeates all parts of the rotating mass or blanket. Still another object is to assure axial flow of the mass from the inlet end to the exit end of the cylinder, and yet another object is to devise a discharge means for emitting from the cylinder the fibres with the asphalt dispersed therethrough under conditions that minimize wastage of steam.

These and other objects that appear hereinafter, can be realized by an apparatus functioning to shred the waste paper, clean it of usual detritus, wet it, and then feed it into a pressure-bearing cylinder through which the waste paper is flowed axially to a discharge outlet on the cylinder by steam flow through the cylinder, which steam heats the mass to an asphalt-melting temperature. Rotating in the cylinder are comb-like members whose whirling rotation develops sufficient centrifugal force to cause the mass to cling to the interior wall or bore of the cylinder in the form of a blanket. The free ends of the comb elements or teeth are spaced sufficiently from the bore of the cylinder to leave a substantial depth of blanket thereon but near enough thereto to comb or sweep the inner margin of the blanket to turbulently remove fibres therefrom. If these comb teeth are generally rectangular and are carried tangentially to a rotating shaft or cylinder within the fixed main cylinder, the turbulence they set up tends to make for a looser blanket and to pull the fibres apart as well as to mobilize them into a suspension in the stream of steam flowing through the main cylinder for further distributing and rearranging them as well as the asphalt particles. This stimulates axial flow of the mobilized turbulently separated fibres. Also for facilitating axial flow and change of direction of these fibres, the cylinder is divided into zones of stepwise increasing diameter for lessening resistance to such axial flow. In other words, the interior or bore of the main cylinder is made of a series of stepped sections, with each step nearer the cylinder outlet being larger in diameter than its preceding adjacent step. These step-downs contribute to the mixing of the fibres separated from the blanket. Then the so-treated mobilized fibres with the melted asphalt completely dispersed through the mass thereof, all in suspension in the stream of steam flowing through the cylinder, are discharged from the end of the cylinder under steam-saving conditions.

Figure 2:
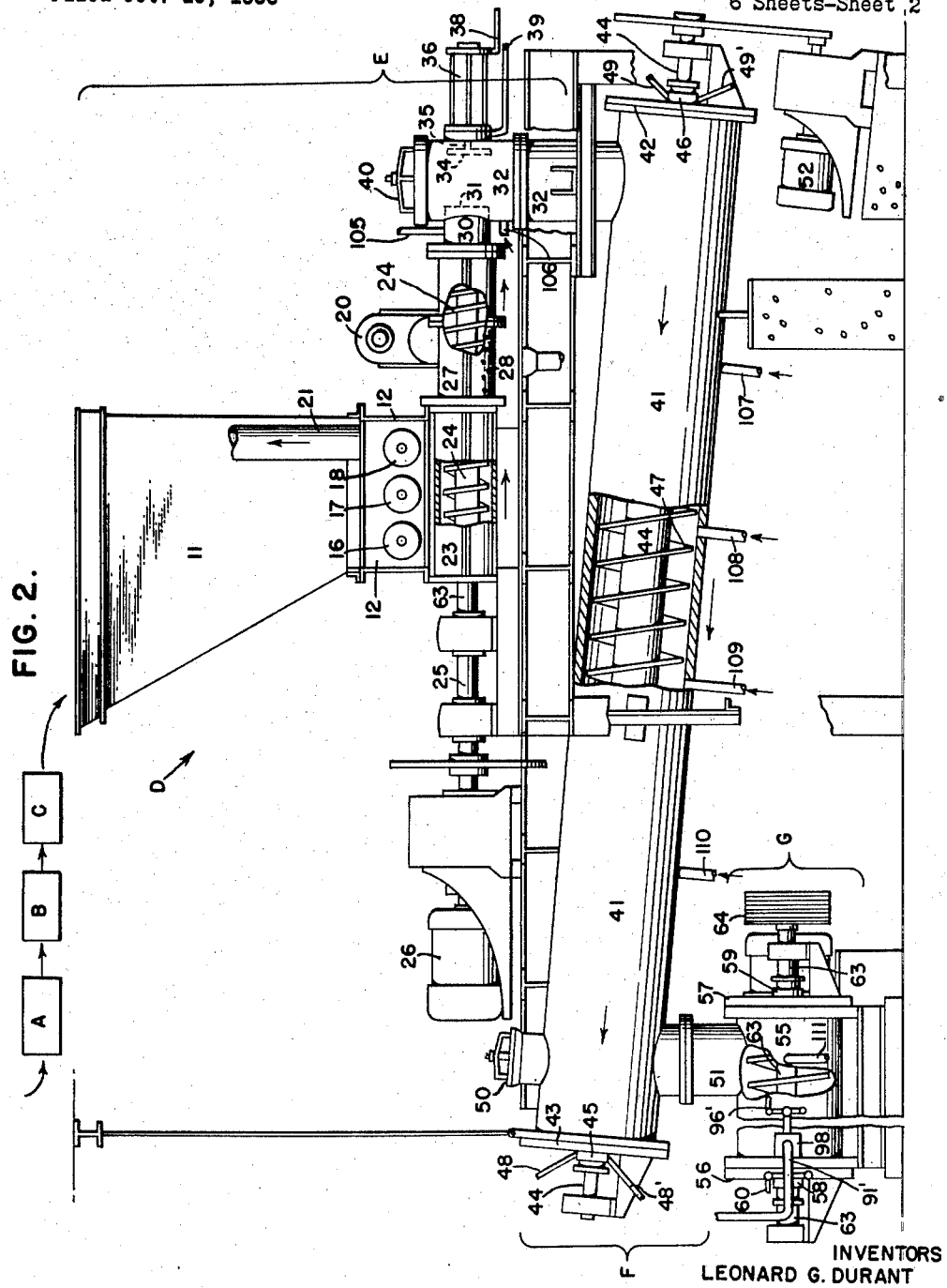
Figure 3:
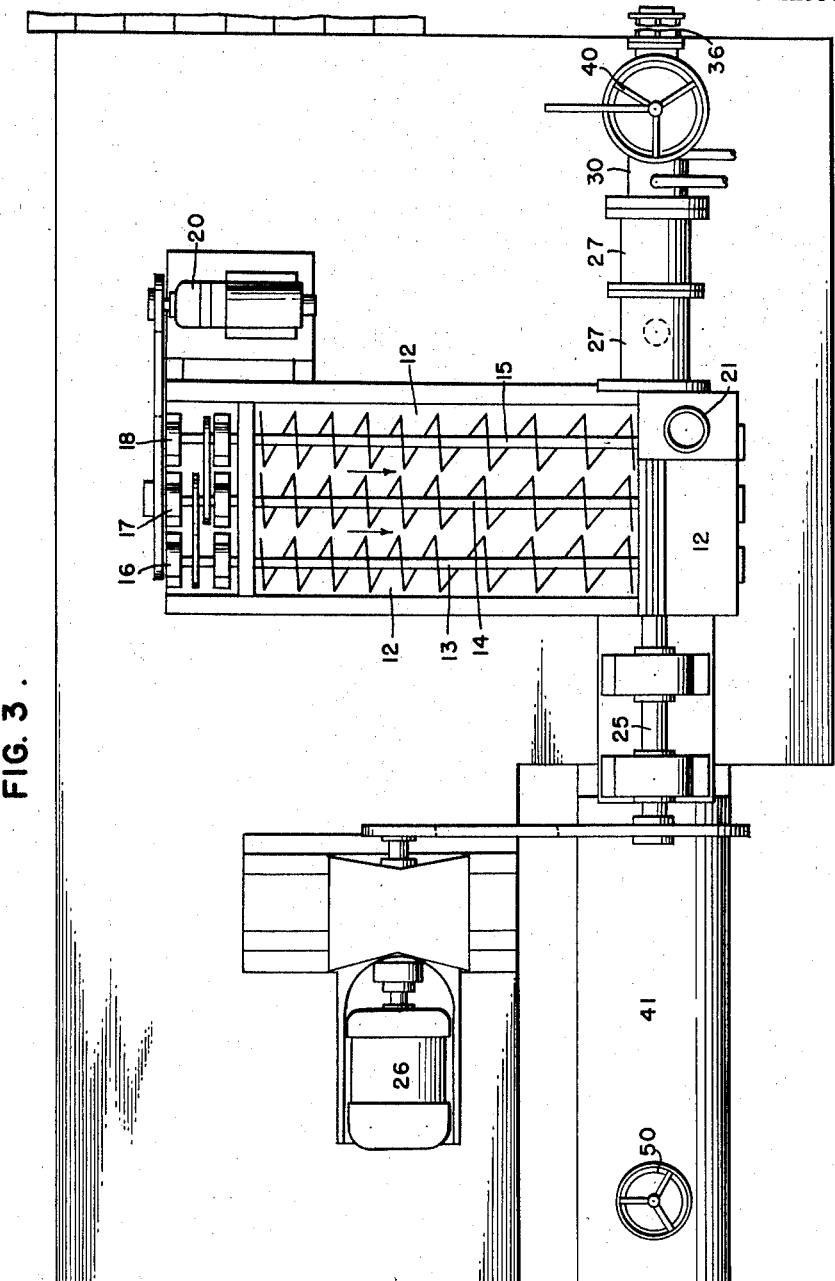
Figure 4:
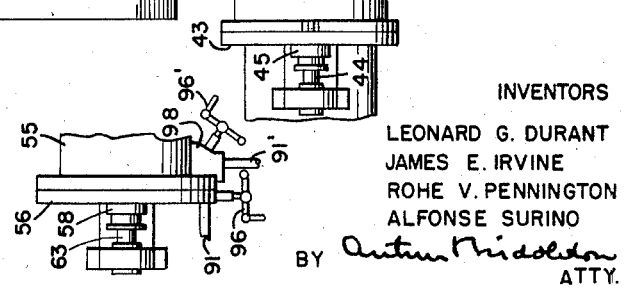
Figure 5:
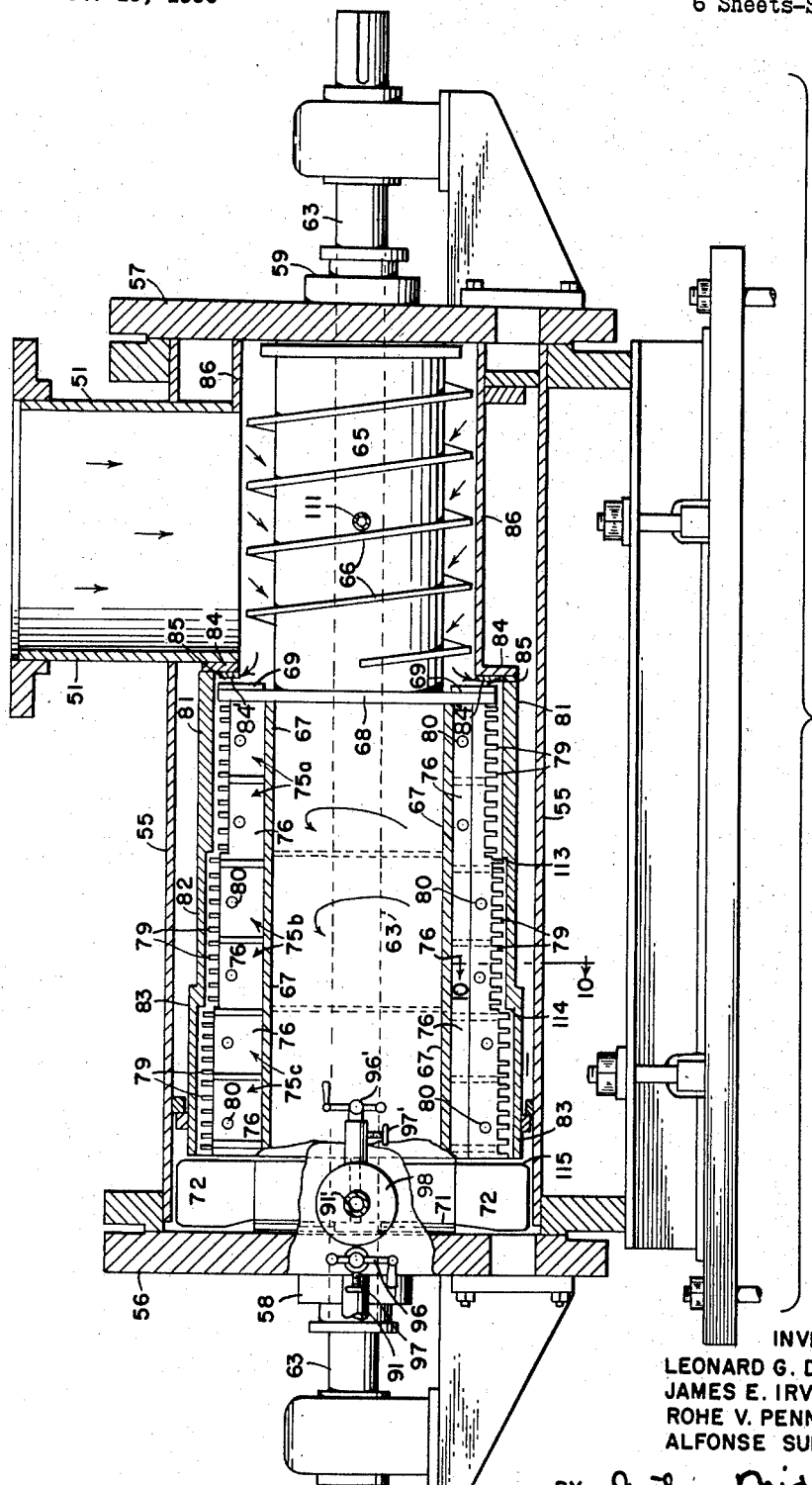

One embodiment of the invention is illustrated in the accompanying drawings in which Figure 1 is an isometric view of such an embodiment. Fig. 2 is a vertical elevational view thereof, with parts in section. Fig. 3 is a plan view thereof, with parts removed. Fig. 4 is a partial detailed view of the discharge mechanism. Fig. 5 is an enlarged vertical sectional view of station G, namely the dispersing zone. Fig. 6 is a partial vertical sectional view of the discharge valve arrangement (with the rotating cylinder 67 and its comb-bearing blades 78 removed). Fig. 7 is a vertical transverse sectional view through the cylinder 67 and showing the manner in which the comb-bearing blades are supported. Fig. 8 shows an end view of the rotating cylinder 67, with its end plate 71 and its fan blades 72. Fig. 9 is a plan view of one of the tooth-bearing plates. Fig. 10 is a partial vertical sectional view along the line 10—10 in Fig. 5. Fig. 11 is a vertical transverse cross-sectional view, shown somewhat diagrammatically, through the dispersing zone G. Fig. 12 is also diagrammatic and a partial view showing the principle of operation of the dispersing action.

The apparatus embodiment of this invention comprises preparatory or pre-treatment stations comprising a shredding station A; a dry-cleaning or detritus-removing station B; a spraying or moistening station C; and a disperser apparatus having three main zones or stations forming a connected tubular flow-path; namely, a feeding-in zone or station E; a heating and moistening or steaming zone or station F; and a dispersing zone or station G. The feeding-in or feed station E comprises a hopper 11 for the contaminated cellulosic starting material such as waste paper, having a bottom compartment 12, provided with a plurality of side-by-side screw conveyors 13, 14 and 15, having either exterior driving pulleys 16, 17 and 18 respectively or driving sprockets, according to choice, suitably driven from a motor reducer 20. From the bottom compartment 12 rises a vent pipe 21. The screw conveyors impel waste paper toward one end of the compartment 12 to fall down into a cylinder 23, equipped with a tapered screw 24, driven by shaft 25 from motor reducer 26, for conveying the waste paper to the right in Figs. 1, 2 and 3, into a casing 27 perforated at its bottom 28, which contains tapered screw 24, and which while beginning compaction of the waste paper impels it into a constricted pipe 30 whose open end 31 lies within a vertical down-pipe 32. The tapered screw 24 has for its function over and beyond that of impelling the waste paper along to the right, the compaction thereof into plug form sufficiently dense to prevent escape of any substantial quantity of steam that rises into the down-pipe 32 from the steaming zone or station B. The open end 31 of the pipe 30 can be closed by a disk or ram 34 on piston rod 35 that enters a cylinder 36 having a piston therein (not shown) that is reciprocated in either direction by means of either a pneumatic or a hydraulic circuit including a control box 37, and pipes 38 and 39 passing to the cylinder 36 on either side of the piston therein. This safety apparatus for closing off electively the discharge free end 31 of pipe 30, is for use in case of shut-down or failure of the steam-resisting plug of material in constricted pipe 30. 40 represents a manhole cover by use of which access may be had to the interior of the down-pipe 32. So much for feeding-in zone or station E.

Now as to the steaming zone or station F: down-pipe 32 is connected to and opens into a relatively long upwardly inclined tube 41, closed at each end by plates 42 and 43 respectively, housing a shaft 44 having two stuffing boxes 45 and 46 and suitably driven by motor 52. The shaft 44 carries a screw conveyor 47 for impelling waste paper upwardly along the inclined tube to the left. The stuffing boxes are lubricated by water carried to and from them by valved pipe circuits 48 with 48' and 49 with 49' respectively. Toward the upper end of the tube 41 and on top thereof is a manhole cover 50 by use of which access may be had to the interior of the tube and particularly aligned over the down-pipe 51 from the bottom of the tube leading to the dispersing zone or station G.

Now as to the dispersing zone or station G: it has a cylinder 55, closed at its ends by end plates 56 and 57, in which shaft 63 is journalled and having stuffing boxes 58 and 59, each stuffing box having a water-cooling valved pipe-circuit 60 with 60' and 61 with 61' respectively. Shaft 63 is suitably driven by motor through pulley 64. Looking now at Fig. 5, it will be seen that shaft 63 has supported from it within the casing 55, one cylinder 65 carrying on its exterior a screw conveyor 66, and a hollow second cylinder 67 slightly larger than the first. At the juncture of these two cylinders, there is a flange or rim 68 having deflecting blades or fins 69 on its marginal section. The hollow cylinder 67 is closed by an end plate 71 carrying radially extending fan blades 72, reinforced by gusset plates 73. The hollow cylinder 67 is provided on its exterior periphery with a plurality of sets of combing devices, each indicated generally by 75$^a$, 75$^b$, and 75$^c$. Except that set 75$^c$ reach from the cylinder 67 a greater distance than set 75$^b$, and set 75$^b$ reach from the cylinder 67 a greater distance than set 75$^a$, their construction is identical, and shown in detail in Fig. 7. Each set is made up of an axially extending plate 76, supported more or less tangentially from the cylinder 67, by gusset plates 77 welded to the cylinder, and at the free edge of each plate 76, is a comb-bearing blade means 78, having on its free edge comb-like teeth or fingers 79, more or less rectangular in cross-section. The comb-bearing blade is held against the tangential plates 76 in extensible relationship by bolts 80. The sets of combing devices are encircled by casings 81, 82 and 83 respectively, each a little greater in diameter than its predecessor so that the clearance between its inner periphery and the sets of moving combing teeth or fingers remain substantially constant. The casing 81 has at its entrance or right hand end, an inwardly depending flange 84 for the purpose of leaving an annular angled entrance passageway 85. 84' represents a plurality of stationary bars or fins that cooperate with the blades 69 and aid in changing the direction of flow of the stock. 86 represents another cylinder connecting with the flange 84 and encircling the screw conveyor 66.

Discharge of a stream of steam in which the fibres of the paper are dispersed in the dispersing station G, takes place electively through the orifice 87 in the end plate 56, or through the radially extending orifice 88 in the periphery of the cylinder 83, see particularly Fig. 6. Orifice 87 comprises an outwardly tapered bore 89 in a sleeve 90 that leads to a discharge pipe 91. The bore 89 has a seat 92 into which fits a valve plug 93 provided with a threaded body 94 turnable in a casing 95 by means of handle 96, while 97 represents a set-screw for securing the valve plug in any adjusted position. The valve plug when seated closes off the bore 87, and it is as near the entrance to the bore as can be arranged. The alternative discharge from the cylinder 67 is through orifice 88 formed by the outwardly tapered bore 89' in a sleeve 90' that either leads to discharge pipe 91' or may lead to an independent discharge, if desired. The bore 88 has a seat 92' into which fits valve plug 93' provided with a threaded body 94' turnable in a casing 95' by means of handle 96', while 97' represents a set-screw for securing the valve plug in any adjusted position. The sleeve 90' is secured in its boss-like housing 98, and removably held therein by set-screw 99. Sleeve 90 is also removably held in place by a similar set-screw (not shown). Steam has to be supplied to the apparatus, and this is done, as can be seen in Fig. 2, through main steam line 102 having a take-off line 103 having a gauge 104 for indicating the steam pressure through branch pipe 105 leading into the pipe 30 and through a second branch line 106 leading into the down-pipe 32. The main steam line has a plurality of branch lines 107, 108, 109, and 110 leading upwardly into the bottom of the steaming tube 41. A further branch line 111 leads into the cylinder 55 of the dispersing station into its right hand end adjacent the screw conveyor 65 thereof. These steam lines are suitably valved.

Turning now to Fig. 9, showing in larger detail one of the comb-bearing blades 78, having the teeth reinforced by webs 112 between their bases and the blade 78. The teeth are staggered as shown in this figure, in that the teeth on the lower edge of the plate are slightly non-aligned laterally as shown by the dotted lines. To aid in identifying this feature, the lower teeth in this figure have been numbered 79' to show how the lower tooth 79' is centered slightly to the left of the center of its corresponding upper tooth 79. Teeth on the succeeding comb-bearing plates 78 are also staggered so that the circular paths of the various teeth as they rotate unitarily with cylinder 67 and shaft 63 (Fig. 11) are not coincidental. In other words, each tooth has its own path and follows a path not followed by any other tooth. The reason for this is given hereinafter. Looking at Fig. 10, it can be seen that between the smaller diameter casing 81 and the next larger casing 82, there is a shoulder or step 113 for rearranging fibers as they pass from the smaller cylinder to the larger as shown by the arrow; that there is another step 114 between middle casing 82 and its next larger casing 83; and that there is a final step 115 leading into a space wherein there is a fan or impeller blades 72. It is to be noted that the blanket cannot be forced backwards due to these shoulders so they aid in insuring the forward axial flow.

Referring now to Fig. 11 which is a somewhat diagrammatic view for illustrating the principle of operation, rotation in a clockwise direction of the cylinder 67 by shaft 63 to which it is fixed, and the comb blades 78 with their combing teeth 79, cause by centrifugal action, the wetted shreds of waste paper to be spun and thrown against the interior periphery or bore of the fixed cylinder 82 (through which a stream of steam is flowing), and to be formed thereon a blanket P of such shreds or bits lining the cylinder. The teeth 79 are rectangular in cross-section, and the teeth (and the blade 78 from which they extend) are supported substantially tangentially from their carrying cylinder 67, so they act about as shown in Fig. 12. That is, the squared ends 116 of the moving teeth 79 extend at an acute angle to the inner cylindrical margin 117 of the blanket P so that in moving past the blanket the teeth tend to sweep edgingly individual fibres away from the blanket as shown by the dotted arrows in Fig. 12.

Returning for a moment to the cleaner station B in Fig. 1, an air-type of air-float cleaner apparatus that has proven to be satisfactory is made by the Sutton, Steele & Steele, Inc., of 1031 South Haskell St., Dallas, Texas, characterized by a vibrating deck covered with a porous fabric through which air is forced by a fan past a baffling system through the deck to form a selective air-lift effect under the particles as a result of which lighter particles are floated out at one end and heavier particles are discharged at the other end of the deck. The main feature of operation being that detritus can thus be removed from the shredded waste paper without submerging the paper in a liquid.

The operating pressures and temperatures vary with the softening characteristics of the asphalt. But the temperatures used are such as will melt or soften the type of asphalt that is in the paper being treated. The steam pressure would be that which is related to the temperature of the saturated steam and the time of residence of the waste material in the apparatus, or its time of transit therethrough, would also depend on the softening point of the asphalt to some extent and also on the steam pressure available at any particular paper mill. In general then, the range of limits are: minimum steam pressure of 10 pounds per square inch gauge pressure and a temperature of 240° F., with maximum steam pressure of 170 p.s.i.g. and a temperature of 400° F. An example is steam pressure of 50 p.s.i.g. with a temperature of 397° F. and a time of residence of from 3 to 5 minutes. It may be desirable under certain conditions to use a sequestering reagent mixed with the waste material being treated, for sequestering the metallic salts present while dispersing the asphalt. An example of such sequestering reagents are the sodium hexametaphosphates, of which a satisfactory one is known as Calgon, manufactured by Calgon, Inc., of Pittsburgh, Pa.

In operation the waste paper to be prepared for use in paper making by being rendered into pulp in which the laminating or other contaminations of the waste paper have been thoroughly dispersed in the pulp, is fed to the shredder station A wherein it is shredded; thence into the detritus-removing station preferably of the dry-cleaning type wherein tramp metal and other foreign objects are removed from the shredded paper; next into the wetting or sprayer station C wherein the cleaned, shredded waste paper is wetted down, but not enough to render it into submergence; and finally into the feeding-in station E. Herein the waste paper is fed into the hopper 11 from which it is discharged progressively and controllably by feed screws 13, 14 and 15, to fall down into cylinder 23, wherein it is conveyed by screw conveyor 24 into perforated casing 27 having another feed screw 24 that is in effect a continuation of screw 24. Screw 29 begins compaction of the waste paper into plug form to prevent the escape of steam backward therethrough and also squeezes excess water therefrom through perforations 28, while functioning to push the plug of shredded, cleaned and wetted waste paper through pipe 30 to drop therefrom down down-pipe 32 to be received into the inclined tube 41 of the steaming zone F, up which inclined tube it is conveyed by screw 44 while being subjected to jets of steam fed into the tube through pipes 107, 108, 109 and 110. Sufficient steam is used to heat the waste paper to a temperature at which the laminating contaminants, such as asphalt, are melted and pass into fluid form and to form a stream of steam that follows through the flow-path formed by the succeeding stations to discharge at the discharge end of the dispersing station. The steam-heated waste paper then drops down down-pipe 51 into the casing 55 of the dispersing station G.

Here the steam-carried waste paper encounters the screw 66 in the cylinder 65, and is thus impelled with sufficient force to pass outwardly substantially radially through passageway 85, between the flange 84 and the casing, aided therein by the deflecting blades or fins 69 on the flange or rim 68 at the end of the cylinder 65. The so-fed waste paper meets the whirling comb-like plates 78, supported from cylinder 67 which in turn is supported from and rotated by shaft 63. The whirling comb-bearing blades 78 force, by centrifugal action, the waste paper bits or particles against the inner periphery or bore of the section 82 to form the particles into a blanket P (see Fig. 11). Since the comb teeth 79 have squared ends 116 (see Fig. 12) and those ends stop short of the inner periphery or bore of the cylinder 82, they tend to flatten the blanket thereagainst as shown and this in turn causes axial flow of the bits of waste paper of the blanket always toward the discharge end of the cylinder. This continuous axial flow is important for otherwise there might develop a clogging of the space between the teeth and the cylinder. Thus, the bits of waste paper formed or spun into the blanket by centrifugal force, are also given a spiralized motion to the left in Fig. 5 toward the discharge end of the dispersing zone or station. Coming back to Fig. 12, the ends of the teeth (being rectangular in cross section) and inclined away from their direction of movement, pull or sweep individualized fibres from the blanket by turbulence, yet without any tendency of the fibres to be cut, sheared or shortened. The pulled-out fibres are thus mobilized in the stream of steam flowing through the bore of the stationary sections 81, 82 and 83, for there is little if any tendency of them to be dragged along with the teeth, for they are sweepingly impelled rather than dragged. Preferably, the clearance between the several combs and their corresponding portions of the tube is such as to render the several blankets of substantially the same thickness.

Lateral or axial movement of the particles of the blanket P as well as of the mobilized individualized fibres suspended in the stream of flowing steam causes them to cascade over the shoulder or step 113 that has the important function of rearranging the particles of the mass cascades down over that step. The mass in this next casing 82 having a larger internal diameter or bore than its predecessor 81, is treated again with the tooth-bearing comb plates 78 in the same manner, and sooner or later, due to the lateral or axial movement of the particles cascades over step 114, whereupon the treatment by the combs is repeated, and finally the treated mass, as individualized fibres, cascades over step 115 (Fig. 5) to encounter fan blades 72 to render the fibres into a whirling mobilized mass thereof ready for discharge, as described hereinafter. Meanwhile the stream of steam flowing through the successive sections 81, 82, and 83 serves as a carrier or suspending medium for the mobilized individual fibres. With the angle of the teeth used, there is a great deal of turbulence set up, a looser blanket results, and there is a considerable rolling over and rearrangement of the fibres. This is due to the spring-back of the blanket after each tooth passes and to the turbulence in the steam behind each tooth. As a result of the constant and incremental rearrangement, displacement, and repositioning of the fibres due to the change of direction over the steps; the fibre-sweeping turbulence set up by the teeth of the whirling comb blades; the axial and spiralized flow of the particles of the loose blanket; and the flow of the stream of steam, all contribute to the dispersal of the fibres and particularly of the diminution of the melted concentrations of asphalt and of the complete dispersion of the asphalt into specks so small as not to be readily discernible in the resulting pulp.

Now as to the discharge of the stream of steam in which is suspended the mobilized mass of fibres turbulently swept from the blanket P lining the sections 81, 82, and 83, kept stirred up by the fan 72 rotating with the rotating cylinder 67 that carries the comb-bearing blades 78: the fibre-ladened stream of steam can be discharged (as shown in Fig. 6) either through the discharge pipe 91' extending radially from the cylinder section 83, if that be desired, or through the main discharge pipe 91 extending from the cylinder section 83 in a direction parallel thereto. As Fig. 6, shows the radial discharge pipe closed off by valve plug 93', while valve plug 93 is open, the suspension will be discharged through valve bore 87 with sufficient force to carry it through pipe 91 to and up pipe 100 (Fig. 1) to the place of its use. The discharge rate through the bore 87, as well as its opening and closing is controlled by valve plug 93 and its operating parts. The tapered bore 89 is important however and the replaceability of the seat 90, because the discharge rate must be controlled to be just enough to discharge the suspension properly without the loss of too much steam. And this applies irrespective of which of the discharge valves is used.

Other modes of embodying the principle of the invention may be employed, so long as there are employed the features stated in the claims, or their conjointly cooperative equivalents.

We claim:

1. The continuous process of treating contaminated material such as waste cellulosic material without rendering the material into liquid submergence, which comprises wetting shredded waste material while substantially detritus-free, maintaining an enclosed zone providing a flow-path for the material and terminating in a bore-bearing dispersing station having a pulp-emitting exit at its end, supplying heat to the zone to maintain it at a temperature above the softening point of the contaminant, feeding wetted shredded material to the zone, conveying the material through the zone to the station, spinning the material in the bore of the station at a speed sufficient to form a blanket thereof lining the bore, controllably supplying a stream of steam to the bore, repetitively turbulently sweeping bits from the blanket by combing fibres therefrom, and regulatably blowing steam from the bore through its pulp-emitting exit carrying in suspension therein such combed fibres having the contaminant dispersed there among as specks so small as not to be readily discernible as such.

2. The process according to claim 1, wherein the wetting of the shredded material is to an extent insufficient to make the material pumpable.

3. The process according to claim 1, with the addition of subjecting the shredded material to the effect of air-separation to remove detritus therefrom.

4. The process according to claim 1, with the addition of establishing and maintaining a plurality of such blanket linings in axial sequence with each succeeding blanket having a larger diameter than its predecessor.

5. The process according to claim 4, with the addition of maintaining the blanket linings at substantially the same thickness.

6. Apparatus for continuously treating contaminated material such as waste cellulosic material without rendering the material into liquid submergence, which comprises means for wetting the material after being shredded and cleaned, an enclosed tubular flow-path means for the paper having a horizontal terminal bore-bearing cylindrical section provided with a material emitting exit at its end, means for maintaining pressure in the flow-path means and a temperature above the softening point of the contaminant, means for feeding wetted shredded material to the flow-path means, means for conveying such material therealong to the cylindrical section, means for spinning such material in the bore of the cylindrical section at a speed sufficient to form a blanket thereof lining the bore, means for supplying a stream of steam to the bore, means for repetitively and turbulently separating bits from the blanket by combing fibres therefrom, and regulatable means forming a restricted exit from said bore for controllably blowing steam from the bore througgh its exit carrying in suspension therein such combed fibres having the contaminant dispersed thereamong as specks so small as not to be readily discernible as such.

7. Apparatus according to claim 6, wherein the pulp-emitting exit is a sleeve whose bore is tapered to be larger at its outlet than at its inlet, and the regulatable means includes an adjustable plug valve that traverses the bore of the sleeve.

8. Apparatus according to claim 6, with the addition of fluid-pressure operated means for closing off the feed of wetted shredded material to the tubular flow-path means for preventing escape of heat and pressure therefrom in the event of a shut-down of the apparatus.

References Cited in the file of this patent

UNITED STATES PATENTS

| | | |
|---|---|---|
| 1,977,807 | Robinson | Oct. 23, 1934 |
| 2,142,823 | Nickerson et al. | Jan. 3, 1939 |
| 2,697,661 | Hollis | Dec. 21, 1954 |
| 2,722,163 | Cumpston | Nov. 1, 1955 |
| 2,824,500 | Cumpston II | Feb. 25, 1958 |